Figure 9:
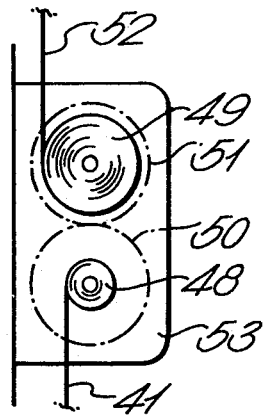

United States Patent [19]

Coenan

[11] 4,147,387
[45] Apr. 3, 1979

[54] SAFETY BELT
[75] Inventor: Michel J. W. Coenan, The Hague, Netherlands
[73] Assignee: Coenen Benelux B.V., Netherlands
[21] Appl. No.: 786,904
[22] Filed: Apr. 12, 1977

[30] Foreign Application Priority Data

Apr. 26, 1976 [GB] United Kingdom ............... 16764/76

[51] Int. Cl.² ............................................. A62B 35/00
[52] U.S. Cl. .................................. 297/388; 242/107; 297/389
[58] Field of Search ................ 297/388, 389; 280/744; 242/107, 107.1

[56] References Cited

U.S. PATENT DOCUMENTS

| | | | |
|---|---|---|---|
| 2,939,519 | 6/1960 | McCall | 297/388 |
| 3,116,092 | 12/1963 | Spranger | 297/388 |
| 3,330,599 | 7/1967 | Inoue | 297/388 |
| 3,348,881 | 10/1967 | Weman | 297/388 |
| 3,425,646 | 2/1969 | Hollowell | 297/388 X |
| 3,439,932 | 4/1969 | Lewis et al. | 297/388 X |

Primary Examiner—James T. McCall
Attorney, Agent, or Firm—J. Rodman Steele, Jr.

[57] ABSTRACT

A safety belt including a length of webbing which is entrained across the torso of a seat occupant, has its ends coupled such that as one is paid out the other is taken up at a different rate and vice versa. The webbing at each anchorage member may be turned through an angle greater than 270°. One of the webbing ends may be fixed to the vehicle and the webbing then entrained around a pulley and back upon itself, the other webbing end being fixed to a yoke supporting the pulley. Alternatively, one webbing end is attached to and wound up on a first drum and the other webbing end is attached to and wound up on a second drum, the first and second drums being coupled for rotation at the same or different angular speeds. The drum may be biased to ensure excess webbing take up. The webbing may be stored on the drums so that it can be initially paid out by both drums until the end of the webbing is reached on one drum, whereupon the webbing is paid out by one drum and taken up by the other.

27 Claims, 11 Drawing Figures

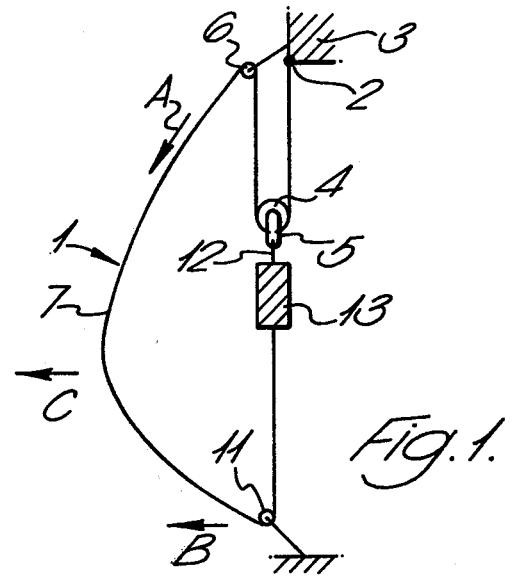
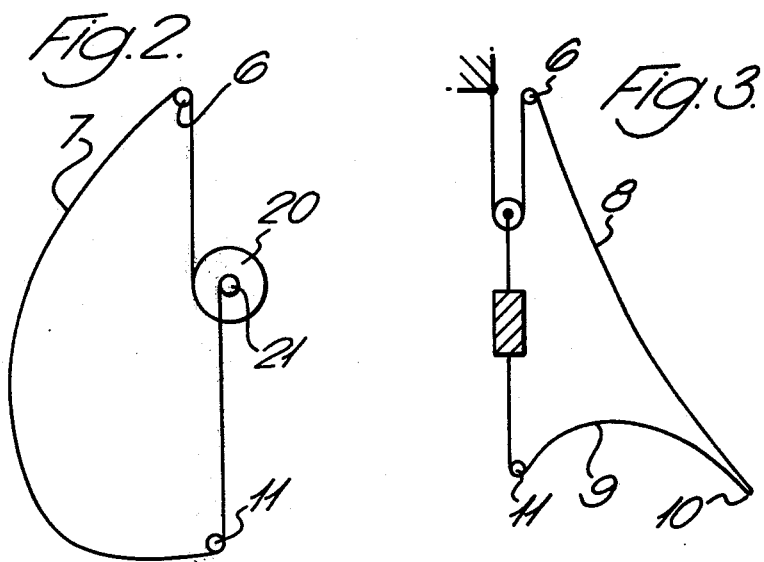

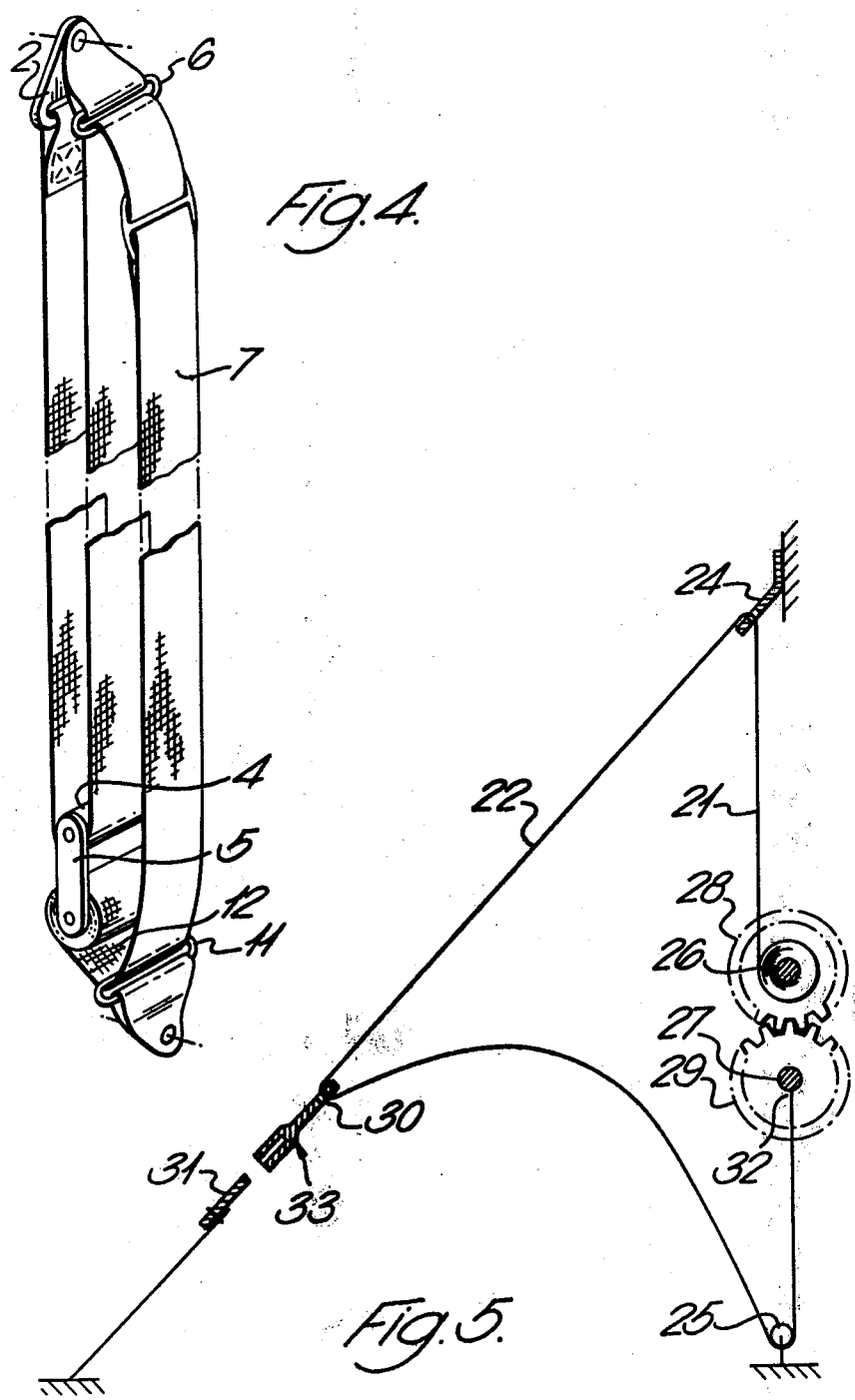

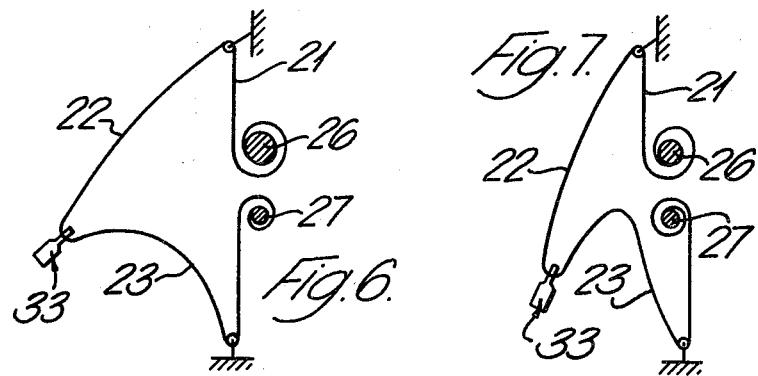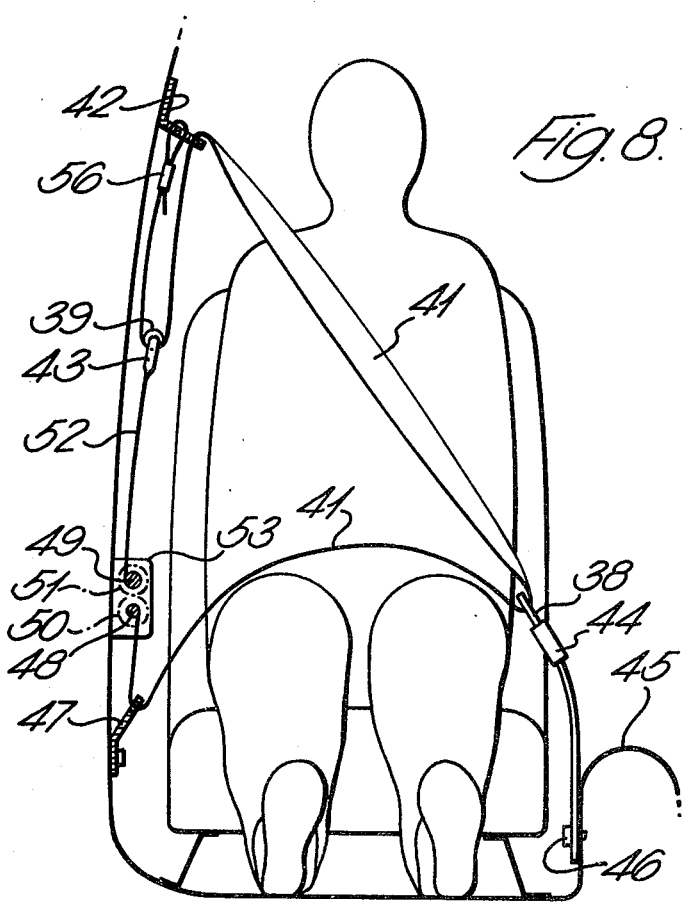

SAFETY BELT

This invention relates to a safety belt for restraining of persons sitting in a seat of a motor vehicle, boat, aircraft or other form of transportation.

Known motor vehicle safety belts are of basically two types, the static belt and the inertia belt. Usually, with both types of belt, a length of webbing is entrained diagonally across the chest of the seat occupant and across his lap. With a static belt, once it is tightened and tensioned across the body of the seat occupant, it is not adjustable so that for example, the seat occupant cannot lean forward in his seat. This has certain disadvantages which are overcome with the inertia belt in which one end of the belt is wound upon a rotatable reel spring biassed in the direction of belt wind up. Under normal conditions, the reel is free to rotate against the spring bias so that seat occupant can lean forward in his seat, the belt unwinding from the reel. Inertia actuated locking mechanism is provided so that under emergency conditions the reel is locked against rotation.

The present invention provides a safety belt which has the advantages of an inertia belt, allowing the seat occupant some freedom of movement, but which does not need a comparatively expensive inertia locking mechanism.

The present invention provides a safety belt comprising a length of webbing for entrainment across the torso of a seat occupant, the end portions of the webbing being coupled such that as one is paid out the other is taken up and vice versa, the rate of take up and pay out of one end portion of the webbing being different from the rate of pay out and take up of the other end portion of webbing.

It will be appreciated that as a result of the difference in the rate of take-up and pay-out, between the two ends of the webbing, the effective length of the webbing entrained across the torso may be lengthened or shortened.

Preferably, in use, the webbing is entrained, from the ends which are coupled, in one direction slideably through an upper anchorage point and in the other direction slideably through a lower anchorage point, the webbing at each anchorage point being turned through an angle which is greater than 270°. With the anchorage points located on the same side of the seat, then the webbing may be entrained diagonally across the chest and across the lap of the seat occupant and attached to an anchorage point on the other side of the seat.

In one arrangement, one end of the webbing is fixed relative to the vehicle chassis and the portion of webbing running from that fixed end is entrained around a pulley and back upon itself, the other end of the webbing being fixed to a yoke in which the pulley is freely rotatable. With such an arrangement there is a 2:1 ratio between the rate of pay out and take up of the webbing around the pulley and of webbing attached to the pulley yoke. A weight may be attached to the yoke to ensure that a light bias is applied to the portion of webbing entrained across the occupant's torso and to ensure that excess webbing is taken up is the occupant leans back in his seat.

In an alternative arrangement, one webbing end is attached to and wound up on a first drum and the other webbing end is attached to and wound up on a second drum the first and second drums being coupled for joint rotation. The drums have different diameters and may be coupled to rotate at the same angular speed; for example, the drums may be fast on a common shaft or may be coupled together by gearing. One or both drums may be biased, for example, by clock springs to apply a light bias to the webbing and to ensure excess webbing take-up. The relationship between the first and second drums may be such that a considerable length of webbing must be paid out from the first drum before a point is reached where the portion of the webbing is correctly tensioned across the torso of the seat occupant. In this case, the webbing is stored on the first and second drums in respective and single directions of rotation. The need to pay out a considerable length of webbing may be a cause of annoyance to the user in view of the time required to adjust the belt. This problem may be overcome by attaching the ends of the webbing to respective first and second drums which are coupled for rotation, the webbing being stored on said drums such that it is initially paid out by both the first and second drums until the end of the webbing is reached on the second drum, whereupon the webbing may be further paid out by the first drum and taken up by the second drum. This reduces the time taken to pay out sufficient webbing for location across the torso of the occupant and hence the time taken to reach a point where the webbing is correctly tensioned. The first and second drums may have different diameters and be coupled by a one:one gear ratio so that they rotate with the same angular velocity. Preferably, the webbing is stored on the first and second drums in opposite rotary directions, the length of the webbing being selected with regard to the size of the occupant such that the end of the webbing is reached on the second drum, as it is paid out therefrom, before the webbing is correctly tensioned. The webbing is then taken up by the second drum in the same direction of rotation as the webbing is stored on the first drum.

In another arrangement, the webbing ends are wound on drums of the same diameter which are coupled so as to rotate together but at different angular speeds.

In a further arrangement, a first length of webbing has one end secured to an anchorage member and is then configured to form a loop before entrainment, in use, across the torso of the seat occupant, the other end portion of the first length of webbing being wound on a first drum. A second length of webbing is secured to said loop and is wound on a second drum coupled for rotation with the first drum. The arrangement is such as to provide a difference in the respective rates of pay out and take up of the end portions of the first length of webbing when said drums rotate.

Preferably, a pulley is suspended by the loop formed in the first length of webbing. The first length of webbing may extend across the chest and lap of the seat occupant, a second loop formed thereby being secured to a second anchorage member. The second anchorage member may be part of a releasable fastener such as a tongue and buckle. The lap portion of the first length of webbing may be entrained about a third anchorage member which, in use, is positioned adjacent the first drum.

In this case, it is an advantage for the first and second length of webbing to be initially paid out from the first and second drums respectively until the end of the first length of webbing is reached on the first drum, the second length of webbing then being further paid out by the second drum as the first length of webbing is taken up by the first drum.

The first and second drums may be coupled for rotation by means of gearing which provides a 2:1 drive ratio with regard to the loop formed in the first length of webbing.

In use, the first and second drums may be commonly mounted at an anchorage point on the vehicle. Alternatively, they may be left free.

One or other of the drums may include biassing means for causing the first and second length of webbing to be rewound on the respective drums.

Figure 10:
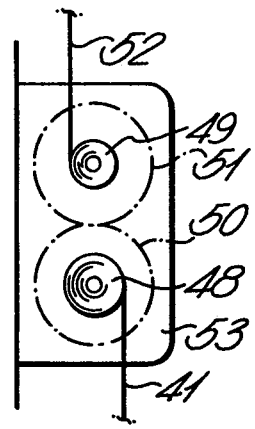
Figure 11:
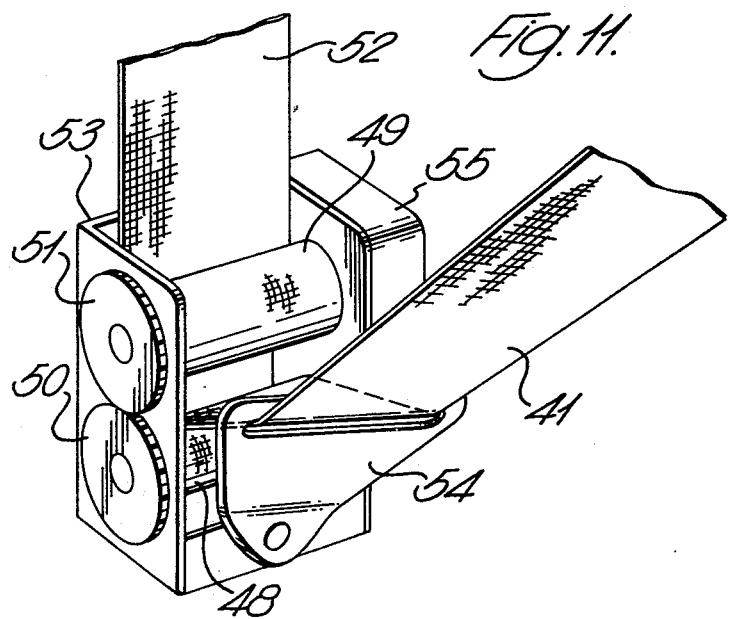

Different embodiments of the invention will now be described with reference to the accompanying schematic drawings, in which:

FIG. 1 shows a first embodiment illustrating the basic principal of a safety belt in accordance with the invention, FIG. 2 shows an alternative embodiment, FIG. 3 shows how the belt of FIG. 1 may be entrained across the chest and lap of a seat occupant, FIG. 4 shows the safety belt layout of FIG. 1 in its storage position, FIG. 5 shows a further embodiment, FIGS. 6 and 7 show the embodiment of FIG. 5 at different stages of operation, FIG. 8 illustrates another embodiment, FIGS. 9 and 10 illustrate different stages of operation of the belt shown in FIG. 8, and FIG. 11 is a perspective view of a detail of a modification to the arrangement shown in FIG. 8.

Referring to FIG. 1, a continuous length of webbing 1 is fixed at an upper end 2 to the vehicle chassis 3, for example the door pillar. From its fixed end, the webbing extends downwardly and is entrained around a rotatable roller 4 freely rotatable in a yoke 5. The webbing then extends upwardly and passes slideably over a fixed upper anchorage member 6. This upper anchorage member 6 is fast with the vehicle chassis, for example the door pillar, and may be of conventional form.

The loop of webbing indicated at 7 in use, as shown in FIG. 3, passes diagonally across the chest of the seat occupant, as indicated at 8 and, as indicated at 9, across the lap of the seat occupant, the loop at 10 being releasably attached to an anchorage point at the side of the seat.

The webbing slideably passes over a lower anchorage member 11, fixed to the vehicle chassis, for example to the floor of the vehicle. The webbing then extends upwardly and its other end 22 is attached to the yoke 5. A weight 13 is carried by the webbing just below the end 12 which is attached to the yoke 5.

With the arrangement shown in FIG. 1, if the webbing passing over the upper anchorage member 6 is pulled down in the direction indicated by the arrow A, the pulley 4 and yoke 5 will move upwardly so that the end 12 of the webbing also moves upwardly, but the rate of withdrawal of the webbing around the pulley 4 and over the anchorage member 6 will be twice the rate at which the end 12 of the webbing moves upwardly. Thus, the size of the loop 7 of webbing will be increased. Conversely, if the webbing is pulled in the direction of the arrow B around the lower anchorage member 11, then the yoke 5 and webbing end 12 will move down but at half the rate at which webbing moves over the upper anchorage member 6, so that the size of the loop 7 will be reduced.

From the foregoing description it will be appreciated that since the size of the loop 7 can be adjusted, so the safety belt can be adjusted to fit around a small or large person. Furthermore, when a person sitting in the vehicle seat wishes to lean forward, this movement may be facilitated by pulling down on the length 8 of webbing (see FIG. 3) and when the occupant sits back the webbing will be tensioned again under the influence of the weight 13.

On collision or impact of the vehicle, the seat occupant's body will be thrown forward in the direction of the arrow indicated at C and the webbing tensioned but there is no tendency, under these conditions, for the size of the loop 7 to increase. During an accident, the whole body moves forward under deceleration, applying loads simultaneously to the lap and diagonal portions 8, 9 of webbing 1. As the weight of the body restrained by the lap portion 9 is considerably greater than the body load restrained by the diagonal portion 8, the forces in the belt system balance out and the body moves forward, to the extent permitted by the belt system, with substantially vertically disposed vertebrae. Thus the occupant is instantaneously and positively restrained in his seat.

When the safety belt is not in use, the weight 13, under gravity, falls and the webbing is neatly tensioned between the two anchorage members 6 and 11, as seen in FIG. 4.

An alternative arrangement of the safety belt is shown in FIG. 2, in which like numerals indicate like parts as shown in FIG. 1.

In the arrangement of FIG. 2, one end of the webbing is attached to and wound around a comparatively large diameter drum 20. The other end of the webbing is attached to and wound around a comparatively small diameter drum 21. The two drums are essentially mounted for common rotation. For example, they are fast on a common shaft which is rotatably mounted on an anchor plate not shown, which is secured to the vehicle and the webbing is wound clockwise on the drum 20 and anti-clockwise on the drum 21, or vice versa. It will be appreciated that with this arrangement, when the two drums are rotated in one direction, for example clockwise as shown in FIG. 2, webbing will be paid out from the drum 20 and taken up on the drum 21 but because of the difference in diameters of the two drums, the rate of pay-out from the drum 20 will be greater than the rate of take-up on the drum 21, thus the effective size of the loop 7 is increased. When the drums are rotated in the anti-clockwise direction, the size of the loop 7 will be reduced because the rate of take-up on the drum 20 is greater than the rate of pay-out from the drum 21.

Instead of having the two drums 20 and 21 fast on a common shaft, they may be mounted in a suitable housing one above the other and coupled together with gearing so that they rotate together.

In another arrangement, not illustrated, the ends of the webbing may be fast with and wound upon two drums of the same diameter which are coupled by gearing so as to rotate together but at different angular speeds so that the rate of take-up and pay-out from one drum is different from the rate of pay out and take up on the other drum.

In all the arrangements where the webbing ends are attached to and wound upon drums, spring biassing may be provided to rotate the drums in the appropriate direction to reduce the effective size of the loop 7 of webbing. The provision of such a spring bias firstly ensures that the loop 7 of webbing entrained across the torso of the seat occupant is always lightly tensioned and, secondly, ensures that when the safety belt is not in use the webbing is wound up and the loop 7 tensioned between the upper and lower anchorage members 6 and 11.

Furthermore, with the arrangement shown in FIG. 1, a spring bias may be used in combination with or to replace the weight 13, to ensure that the loop 7 is always maintained under slight tension.

Referring to FIG. 5, a length of webbing 21, including a chest portion 22 and a lap portion 23, is entrained over pulleys or guides 24, 25 respectively mounted in the roof and on the floor of a vehicle. Webbing 21 is threaded through a running loop 30 forming part of a buckle 33. One end of the webbing 21 is stored on a first reel 26 and the other end on a second reel 27. The diameter of reel 26 is greater than the diameter of reel 27, for example, in the ratio 2:1. The reels are connected to respective toothed wheels 28, 29 of the same diameter, which are meshed so that reels 26, 27 rotate with the same angular velocity. However, due to the difference in the diameters of reels 26, 27, the respective rates of take up and pay out are different.

The length of webbing 21 may be adjusted by suitable means, such as a sliding buckle (not shown), with regard to the torso of the seated occupant, so that the end 32 of the webbing 21 is reached on reel 27 at a predetermined point when the webbing is paid out from both reels 26, 27. This stage is illustrated in FIG. 5 and it may be reached as the occupant draws together a tongue 31, which is fixed to the floor of the vehicle, and the buckle 33. Before this point is reached, as illustrated in FIG. 6, the webbing 21 is paid out from both reels 26, 27 due to the opposite direction of rotation of the webbing stored on the respective reels. After the predetermined point has been reached, the webbing is wound up on reel 27 as it is paid out from reel 26, the direction of belt wind-up being the same on both reels as illustrated in FIG. 7. The webbing 1 is then tightened across the torso of the occupant with some of the webbing rewound on reel 27. It is essential that some of the webbing 21 has been rewound on reel 27 before the safety belt is in a safety restraining condition and this may be observed by the occupant if a length of the webbing, which extends from reel 27 to a predetermined point beyond pulley 25 (with the webbing in the state shown in FIG. 1), includes a marker. For example, the latter length of the webbing 21 may be coloured or it may include a coloured stripe. Alternatively, a coloured marker band may be fixed to, or form part of the belt and be located at the predetermined point. The occupant then knows that the webbing has been rewound on drum 27 when the marker has disappeared from view, or lies between pulley 25 and reel 27. When the webbing is in this state, the occupant may normally lean forward, the webbing being paid out from reel 26 and taken up by reel 27. However, in an accident, when the occupant is accelerated with respect to his seat, the reels 26, 27 do not revolve and the webbing 1 acts as a restraint.

Essentially, the end of the lap portion 23 of webbing 21 is reached on the driven reel 27 before the buckle 33 is attached to the tongue 31. This ensures that some of the webbing 21 has been rewound on reel 27 when the belt is secured for safety restraint.

Reel 26 may be coupled to a rewinding mechanism, such as a clock spring, automatically to retract the webbing 21 when the buckle 33 is released from the tongue 33.

To reduce friction between the lap portion 23 and the clothing of the user, a sleeve made of, or lined with low friction material may be attached to the buckle 33 through which the lap portion 23 is threaded. The sleeve then rests on the users lap allowing the lap portion 23 to slide through it.

Referring to the FIG. 8, one end of a first length of webbing 41 is secured to an upper anchorage point by means of a pivotally mounted anchor bracket 42. Bracket 42 may be secured, for example, to the upper portion of the door pillar of a vehicle. Webbing 41 is entrained about loop forming means comprising the bracket 42 and a freely suspended pulley 39 fitted in a yoke 43. The belt 41 passes downwardly from bracket 42, under the pulley 39 and back to a running loop in bracket 42 before it is entrained across the chest of the seat occupant. The running loop and anchorage loop of bracket 42 may be separate components which are mounted on the same mounting bolt.

After passing diagonally across the chest of the seat occupant, the webbing 41 passes through a running loop in a tongue 38 which releasably engages a buckle 44. Buckle 44 is mounted on a stalk which is secured to the transmission tunnel 45 of the vehicle by means of a bolt 46. Webbing 41 then passes over the lap of the seat occupant, through a further running loop, which is provided by a bracket 47 anchored to the side of a vehicle, and is then wound on a first drum 48. The word "drum" is used generically herein to cover, for example, a rotatable member on which the webbing may be wound including a spindle, shaft or roller.

Drum 48 is mounted for rotation with a second drum 49 by means of meshed gears 50, 51. Drums 48, 49 are mounted on a frame 53 which is also anchored to the side of the vehicle. At least one of the drums 48, 49 is biased in a direction to retract the webbing 41, for example, by means of a coil spring (not shown). Both drums are of similar diameter and are geared together so that as one drum rotates, the other rotates at substantially the same velocity.

A second length of webbing 52 has one end wound on and fastened to drum 49, the other end being secured to yoke 43. An adjuster 56 is provided to allow people of different sizes to use the safety belt arrangement and to cater for extremes of seat adjustment.

Referring to FIGS. 9 and 10, the manner in which the lengths of webbing 41, 52 are wound on the respective drums 48, 49 will be explained in greater detail. FIG. 9 shows the operating state of the drums when, for example, the webbing is stowed and is not worn by the user. In this case, the length of webbing 52 is retracted on, and wound about drum 49, the length of webbing 41 also being retracted on and wound about drum 48 but having a relatively smaller number of turns. When the seat occupant puts the belt on, he grasps the webbing 41 or the tongue 38 at the bracket 42 and pulls it across his torso. This initially causes both drums 48, 49 to rotate in a sense to pay out the lengths of webbing 41 and 52. However, when all of the webbing 41 has been paid off from reel 48, the sense of winding changes and thereafter the webbing 41 is wound on drum 48. The latter operational state is shown by FIG. 10. The belt is worn when the drums are in the operating state shown by FIG. 10.

The optimum ratio between the pay out and take up of the ends of the length of webbing 41 is about 2:1 having regard to the loop formed by bracket 42 and pulley 39.

Referring to FIG. 11, the pulley frame 53 acts as a lower anchor point which is provided with a pivotally mounted running loop 54. Loop 54 is shown pivoted at a point midway between the walls of the frame 53 but other arrangements are possible, for example, a loop pivoted close to one end of the slot. Gears 50, 51 are normally provided with a cover (not shown).

A spring (not shown) of the type normally used in inertia reels acts to bias the upper drum 49, a housing 55 being provided to prevent damage to the spring. In practice, less turns are required from the spring than from an equivalent inertia reel spring (typically ten turns on the former compared with sixteen on the latter). This enables either a lighter and cheaper spring, or a spring with a flatter rate to be used to provide greater comfort.

The frame 53 need not be attached to the vehicle but left free. In this case, the weight of the drum assembly and the level of bias exerted by the rewind spring needs to be taken into consideration. For example, when the length of webbing 41 is worn by the user, the lower drum 48 will pay off webbing until the change over point is reached (between the state shown in FIGS. 9 and 10) but it will not then rotate any further.

What we claim is:

1. A safety belt comprising a length of webbing having a first end portion, an intermediate portion and a second end portion, said intermediate portion providing lap and diagonal parts of said safety belt, said lap part being provided for restraining the major body weight of a seat occupant and said diagonal part being provided for restraining the upper torso of said occupant, said first end portion being coupled to said second end portion such that as said first end portion is paid out, said second end portion is taken up and vice versa, the rate of take up and pay out of said first end portion being different from the rate of pay out and take up said second portion, whereby during an accident, said rates of pay out and take up of said end portions cooperate with the loads applied to said lap and diagonal parts to restrain said occupant in a substantially upright seated posture during deceleration.

2. A safety belt according to claim 1 wherein the webbing is entrained, from the end portions which are coupled, in one direction slidably through a first anchorage member and in the other direction slidably through a second anchorage member, the arrangement being such that when the belt is fitted to a vehicle with the first and second anchorage members attached adjacent the occupant's shoulders and hips respectively, the webbing at each anchorage member is turned through an angle which is greater than 270°.

3. A safety belt according to claim 1 further comprising a first anchorage member through which said first end portion is slideably fed, a pulley and a yoke in which said pulley is freely rotatable wherein the terminal end of said first end portion is adapted to be fixed relative to a vehicle chassis, said first portion being a length of said webbing running from that fixed end and entrained around said pulley and back upon itself, said second end portion being fixed to said yoke in which said pulley is freely rotatable.

4. A safety belt according to claim 3 wherein a weight is attached to the yoke to insure that a light bias is applied, in use, to said intermediate portion of the webbing and to insure excess webbing take up.

5. A safety belt according to claim 1 wherein said first end portion of the webbing is attached to and wound up on a first drum and said second portion of the webbing is attached to and wound up on a second drum, the first and second drums being coupled for rotation.

6. A safety belt according to claim 5 wherein said drums have different diameters and are coupled to rotate at the same angular speed.

7. A safety belt according to claim 5 wherein said drums are fast on a common shaft.

8. A safety belt according to claim 5 wherein said drums are coupled together by gearing.

9. A safety belt according to claim 5 wherein one or both drums are biased to apply a light bias to the webbing and to ensure excess webbing take up.

10. A safety belt according to claim 5 wherein the terminal ends of the webbing are attached to the respective first and second drums, the webbing being stored on said drums such that it can be initially paid out by both the first and second drums until the terminal end of the webbing is reached on the second drum, whereupon the webbing can be further paid out by the first drum and taken up by the second drum.

11. A safety belt according to claim 10 wherein said drums have different diameters and are coupled by a one:one gear ratio so that they rotate with the same angular speed.

12. A safety belt according to claim 10 wherein said drums have the same diameter and are coupled to rotate together at different angular speeds.

13. A safety belt according to claim 10 wherein the webbing is stored on the first and second drums in opposite rotary directions.

14. A safety belt according to claim 10 wherein the length of the webbing is adjustable with regard to the size of the occupant such that the terminal end of the webbing is reached on the second drum, when paid out therefrom, at a point which is selected to ensure that some webbing is taken up by the second drum when the safety belt is fastened.

15. A safety belt according to claim 14 including means for indicating that some of said webbing has been taken up again by the second drum.

16. A safety belt according to claim 1 further comprising storage drum means wherein said first end portion of said webbing is configured in a loop, and said second end portion is coupled to said loop through said storage drum means.

17. A safety belt according to claim 16 wherein said first end portion is secured to a first anchorage member, is then entrained about loop forming means and said second end portion is wound on a first drum; an additional length of webbing being secured between said loop forming means and a second drum, said second drum being coupled for rotation with said first drum.

18. A safety belt according to claim 17 wherein said loop forming means comprises a pulley which is suspended by said loop.

19. A safety belt according to claim 18 wherein said intermediate portion is secured to a second anchorage member.

20. A safety Belt according to claim 19 wherein the second anchorage member is part of a releasable fastener.

21. A safety belt according to claim 20 wherein the lap part of said intermediate portion is entrained about a third anchorage member which, in use, is positioned adjacent the first drum.

22. A safety belt according to claim 17 wherein the first and second drums are coupled for rotation by gearing which provides 2:1 drive ratio.

23. A safety belt according to claim 17 wherein the first and second drums are commonly mounted or a fourth anchorage member for attachment to a vehicle.

24. A safety belt according to claim 17 wherein the first and second drums are mounted on a common freely suspended member.

25. A safety belt according to claim 17 wherein said webbing can be initially paid out from the first and second drums respectively until the terminal end of the length of webbing is reached on the first drum and said additional length of webbing can then be further paid out by the second drum as said respective length of webbing is taken up by the first drum.

26. A safety belt according to claim 25 wherein the webbing is adjustable with regard to the size of the occupant such that the terminal end of the webbing is reached on the first drum, when paid out therefrom, at a point which is selected to ensure that some of said webbing is taken up by the first drum when the safety belt is fastened.

27. A safety belt according to claim 26 including means for indicating that said some of said webbing has been taken up again by the first drum.

* * * * *